United States Patent [19]

Jebens

[11] 4,381,557
[45] Apr. 26, 1983

[54] OPTICAL FOCUS SENSOR

[75] Inventor: Robert W. Jebens, Skillman, N.J.

[73] Assignee: RCA Corporation, New York, N.Y.

[21] Appl. No.: 218,100

[22] Filed: Dec. 19, 1980

[51] Int. Cl.³ .............................................. G11B 7/12
[52] U.S. Cl. ...................................... 369/45; 369/46;
                                        369/118; 369/120; 250/201
[58] Field of Search .................. 369/45, 46, 111, 112,
       369/120, 118, 121; 358/128.5, 342; 250/201,
                                        208, 209, 570, 578

[56] References Cited

U.S. PATENT DOCUMENTS 4,085,423  4/1978  Tsunodo ............................... 369/122
4,152,586  5/1979  Elliott ................................... 369/111

FOREIGN PATENT DOCUMENTS 55-125545  9/1980  Japan ..................................... 369/46

*Primary Examiner*—Alan Faber
*Attorney, Agent, or Firm*—E. M. Whitacre; J. S. Tripoli; J. E. Roehling

[57] ABSTRACT

Recovery from a record of data recorded in an information track, comprising depressed areas of a given width, a given depth, and variable length, alternating along the length of the track with relatively non-depressed areas, is effected by an optical playback system. The playback system employs means for focusing light from a laser source on the information track as a light spot having a diameter which is diffraction limited. The focusing system includes an independent light source (e.g., laser) which impinges on the surface of the record as a circular spot which illuminates a plurality of elongated tracks. The circular spot is imaged by a lens system on to a detector plane which is positioned at a plane which is conjugate to the record surface. The focus error signal which is used to adjust the position of the objective lens with respect to the record surface is representative of a measure of the diameter of the circular spot imaged on the detector plane, and, thus, is a measure of the diameter of the circular spot at the record surface.

4 Claims, 5 Drawing Figures

OPTICAL FOCUS SENSOR

This invention relates to an apparatus for reading or recording information, for example, video and/or audio information, on a flat, record medium and, more particularly, to a focusing system for use in such recording apparatus for positioning a focusing lens to maintain a radiant beam accurately focused on a moving surface of the record medium.

In an optical video disc player a disc is rotated on a turntable while a light beam scans an information surface of the disc. A focusing lens forms the light beam to a diffraction limited spot on the information surface. Light modulated by the information recorded on the disc surface is reflected back through the focusing lens and directed onto a photodetector that provides a video output. In order to read out the information recorded at high densities on the disc surface, the light beam must be accurately focused on the video disc surface so that the light spot covers only a very small area, as mentioned above. In the most advantageous arrangement the size of the light spot is diffraction limited. In a video disc player the surface to be read may not be perfectly flat with respect to a fixed point at the disc rotates—if the disc is rotated on a turntable, eccentricities in the disc, in the turntable or in the rotating drive mechanism may displace the surface of the disc. In general, the focusing lens is provided to focus a light beam precisely on the video disc surface so as to form a beam spot of the desired size. These eccentricities, however, change the distance between the focusing lens and the surface of the disc, thereby defocusing the impinging light beam. Variations in spacing between the focusing lens and the disc surface can be compensated for by moving the focusing lens toward and away from the disc surface to reposition the focus spot, but this requires apparatus for sensing the amount and direction of shift of the video disc surface.

In general, the present invention provides a new and improved focusing apparatus. In operation the apparatus senses the diameter of a light spot reflected from a record medium surface wherein the diameter is indicative of the focus condition of the record. An error signal representative of the diameter of the light spot is provided to a focusing lens actuator to compensate for variations between the sensed position and an in-focus condition.

In accordance with the principles of the present invention an apparatus for use in playback of a record medium having information stored along successive tracks on a reflective surface of the record medium is provided. The apparatus which controls the actuation of a focusing lens to maintain a read beam in-focus on the reflective surface of the record medium comprises a first light source emitting a light beam of a given wavelength. First means are provided for projecting the light beam emitted by the first light source to impinge on the reflective surface of the record medium as a circular spot, ie, the light source is focused beyond the surface, having a diameter sufficiently large to span a plurality of the tracks. The circular spot is imaged by appropriate means to a conjugate circular image at a plane remote from the reflective surface of the record medium. Positioned at the conjugate image plane are means for measuring the diameter of the circular image of the circular spot wherein a first given diameter of the circular image of the circular spot is representative of the in-focus condition. Further, the apparatus includes means, responsive to the measuring means, for varying the position of the first projecting means to maintain the diameter of the circular image at the first given diameter such that the in-focus condition is effected.

In accordance with one aspect of the present invention, an apparatus for use in playback of a disc-shaped record medium having a spiral groove formed in a flat, reflective surface thereof is provided. The apparatus comprises means for illuminating a region of the grooved surface of the record medium wherein the illuminated region is sufficiently large to span a plurality of convolutions of the spiral groove. The illuminating means includes means for forming a beam of light directed toward the surface of the disc along an incident beam path and converging the light beam toward a point beyond the surface. Light detection means having a plurality of photosensitive regions are arranged on a flat plane. A light path optically couples the illuminated region and the flat plane and means are provided within the light path which acts on the light reflected from the illuminated region to image the illuminated region onto the flat plane as a circular area. Further, the apparatus includes means which are coupled to the photosensitive regions for measuring the diameter of the circular area wherein a first given diameter of the circular area is representative of an in-focus condition. Means which is responsive to the means for measuring the diameter of the circular image varies the position of the means for converging the light beam toward a point to maintain the diameter of the circular area at the first given diameter such that the in-focus condition is effected.

In accordance with another aspect of the present invention a focus control apparatus for use with a disc-shaped record medium having information stored in a spiral groove formed on a flat, reflective surface of the record medium is provided. The apparatus comprises a second light source emitting a beam of light of a second given wavelength and a first light path optically coupling the first light source and the reflective surface of the record medium. The first light path includes means for focusing the light beam emitted by the second light source to a diffraction limited spot on the surface of the record medium. A second light detection means having a photosensitive surface is used to detect the information stored in the spiral groove. A second light path optically couples the focused light spot on the surface of the record medium to the photosensitive surface of the second light detection means. The apparatus further includes the first light source emitting a beam of light of the first given wavelength and a third light path optically coupling the first light source and the reflective surface of the record medium. The third light path includes the means for focusing. The means for focusing converges the light beam emitted by the first light source such that it impinges on the reflective surface as a circular region having a diameter sufficiently large to span a plurality of groove convolutions of the spiral groove. A first light detection means having a plurality of photosensitive regions is arranged to measure the diameter of an illuminated spot incident on it. Further, the apparatus includes a fourth light path coupling the circular region on the reflective surface to the first light detection means which light path includes means for imaging a conjugate image of the circular region onto the second light detection means. The apparatus also includes means which is responsive to the first light detection means for generating a signal representative of the diameter of the conjugate image and means which is responsive to the signal generated by the generating means for varying the distance between the focusing lens and the reflective surface of the record medium to maintain the light beam emitted by the second light source in-focus on the reflective surface.

Other features and advantages of the invention will be more fully understood from the following detailed description of the preferred embodiment, the appended claims, and the accompanying drawing in which:

Figure 1:
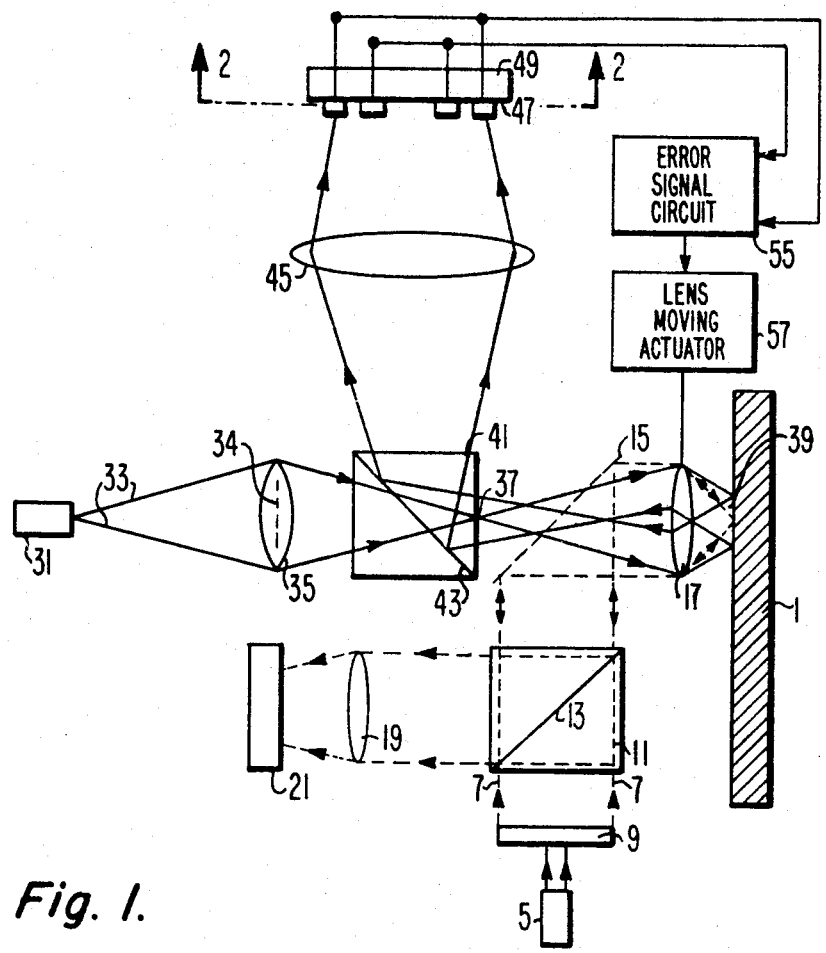
FIG. 1 is a schematic diagram of a light beam control and focusing arrangement of an optical disc player constructed in accordance with the principles of the present invention.

Referring to FIG. 1, in the apparatus shown a disc-shaped record carrier 1 is rotated 3 by a motor (not shown). Illustratively, record carrier 1 may be of a type described in U.S. Pat. No. 3,842,194 issued to J. K. Clemens. In certain high density information records, video information is recorded as relatively short (e.g., 0.6–1.6 micrometers) variations along the length of a information track. Illustratively, the method of recording may be of a type shown in U.S. Pat. No. 4,044,379, issued to J. B. Halter. Pursuant to the Halter method, an electromechanically driven stylus (e.g., of diamond) responsive to a combined video and audio signal records relatively short geometric variations representative of the time variations of the signal on a reflective surface of a metal substrate. After the electro-mechanical recording operation, the recorded surface of the metal substrate has a relief pattern corresponding to that which is desired in the final record. The apparatus of FIG. 1 provides a system for verifying the information cut on a metal master of a type described in the Clemens' patent prior to further processing operations.

A source of radiaton 5 emits a beam of light bounded by rays 7. Illustratively, radiation source 5 may be of helium-neon laser, emitting a beam of coherent light of generally circular contour at a wavelength of approximately 633 nanometers. The circular light beam emanating from light source 5 enters expanding telescope 9 and emerges generally with no change in shape but enlarged in cross-section. This enlarged light beam enters the entrance face of beam splitter 11 which may include half silvered mirror 13. The enlarged light beam is transmitted by the exit face of beam splitter 11 unchanged in shape. This enlarged light beam impinges upon mirror 15 and is totally reflected toward a track of disc 1. Mirror 15 may be a dichroic mirror which transmits light of one wavelength and reflects light of another wavelength. Lens 17, interposed between mirror 15 and disc 1, receives the light beam and focuses the beam to form a diffraction limited spot on a track of disc 1.

The focused light beam is diffracted by the recorded data, appearing in the spiral track as a succession of depressed areas alternating along the length of the track with non-depressed areas. The reflected light is collected by lens 17 and directed toward mirror 15. The light impinges onto mirror 15 and is reflected thereby toward beam splitter 11. The reflected light arrives at the beam splitter 11 and is reflected by the beam splitter 11 in a direction orthogonal to the incident light path. This orthogonally reflected light is converged by lens 19 onto a light accepting region of light detector 21. Detector 21 which may be of a type illustrated in U.S. Pat. No. 4,065,786 issued to W. C. Stewart, converts the light energy reflected from the disc to electrical energy. The detector output signal will be a reproduction of the recorded data.

The apparatus according to FIG. 1 includes means for detecting whether the plane of record carrier 1 is in its desired position. A second source of radiation 31 provides a light beam bounded by rays 33. Illustratively, source of radiation 31 may be a semiconductor laser emitting a beam of coherent light of generally circular contour at a wavelength of approximately 820 nanometers. The light beam bounded by rays 33 emanating from source 31 enter lens 35 and is focused to a spot 37 which may represent an apparent source of radiation source 31. The light beam from source of radiation 31 enters the entrance face of beam splitter 41 and is transmitted by the exit face unchanged in shape. Beam splitter 41 may be comprised of half silvered mirror 43. Further, the light beam from light source 31 passes through dichroic mirror 15 which transmits light from source 31. Lens 17 interposed between mirror 15 and record carrier 1 receives the light beam from radiation source 31 and causes it to converge to form a light spot 39 of a generally circular contour having a diameter sufficiently large to span a plurality of convolutions of the spiral track formed on record medium 1 (ie, lens 17 focuses the beam to a point beyond the surface). The reflected light from light spot 39 is collected by lens 17, passes through mirror 15 and impinges on beam splitter 41. The reflected light which arrives at beam splitter 41 is reflected by half silvered mirror 43 in a direction orthogonal to the incident light path. Lens 45 images the surface of record carrier 1, i.e., the surface within light spot 39, onto surface 47 of support block 49. The circle of light incident on surface 47 illuminates a pair of photodetectors 51 completely. When lens 17 is properly located so that the light beam from source of radiation 5 is incident on disc 1 as a diffraction limited spot, the light beam from the source of radiation 31 is incident on disc surface as a circle of confusion. In practice, light spot 39 is imaged to surface 47 such that its image illuminates approximately one-half of the photosensitive surface of detectors 53.

Figure 2:
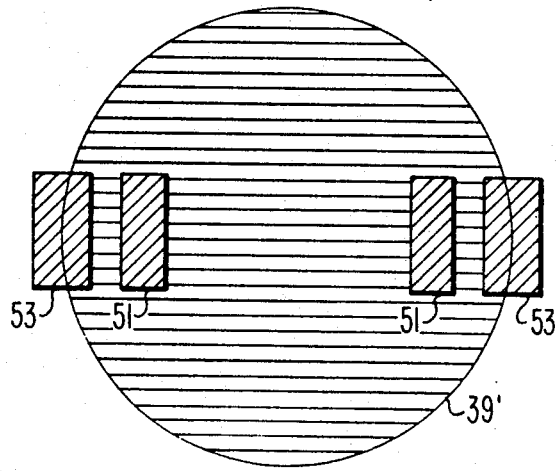
FIG. 2 is a sectional view as taken through arrows 2—2 of FIG. 1.
Figure 3:
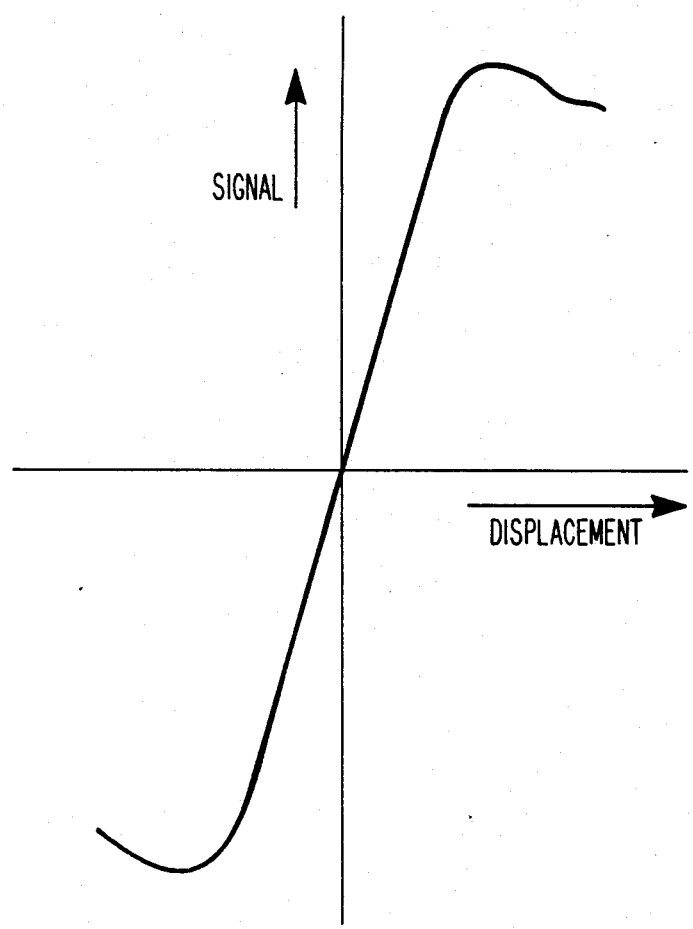
FIG. 3 is a waveform illustrating various characteristics of the transducer and error signal circuit shown in FIG. 1.

Referring to FIG. 2, a sectional view taken at the surface of support 49 shows light spot 39', which represents an image of light spot 39, completely illuminating inner photodectectors 51 while illuminating approximately one-half of outer photodetectors 53. By taking approximately one-half of the sum of the output signals from detectors 51 and subtracting the sum of the output signals from detectors 53 a null is obtained when the light beam from radiation source 5 is in-focus on record carrier 1 (ie, a measure of the diameter of light spot 39' thus of light spot 39). When the output from detectors 53 decreases which indicates that the light from source of radiation 5 is focused above record carrier 1, the difference output of the error signal will be greater than zero. While if the output from detectors 53 is greater than the attenuated output from detectors 51 which indicates that the light from source of radiation 5 is inside of focus, the difference signal will be less than zero. FIG. 3 is representative of the error signal from circuit 55 versus displacement of lens 17 for small displacements of the record surface in accordance with the aforementioned summing technique.

Figure 4:
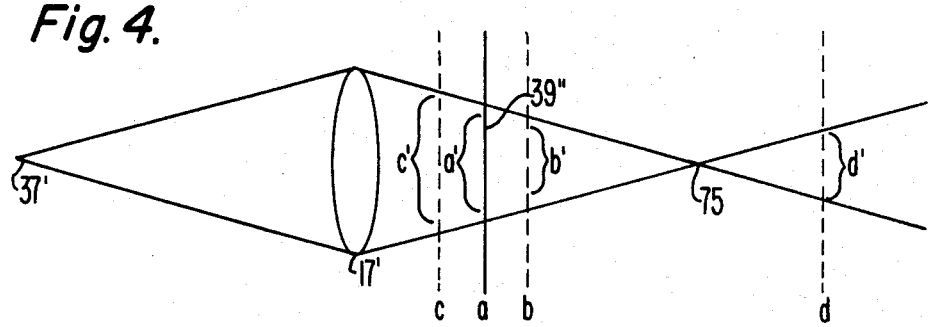
FIG. 4 is a diagrammatic and simplified representation of a portion of FIG. 1.

A simplified representation of a portion of FIG. 1 is shown in FIG. 4. Apparent source 37' is focused by objective lens 17' to a point 75. When the plane of the disc surface is in the correct position (position a) the illuminated region 39" is a circle of diameter a' and lens 17' focuses apparent source 37' to point 75 which is located beyond the surface of the disc. The illuminated region 39" is focused as discussed above to a complete plane onto detectors 51 and 54 of FIG. 1 which provide an error signal representative of the focus condition. When the plane of the disc being read shifts to a position of the illuminated region 39" is formed as a circle of diameter c' which is larger than a' and when the plane of the disc shifts to a position b the illuminated region 39" is formed as a circle of diameter b' which is smaller than a'. In these cases, i.e., when the disc surface is positioned at b or c, the error signal from detectors 51 and 53 provides an indication of an out-of-focus condition. In effect the error signal from detectors 51 and 53 provide an indication of the diameter of the circle at the disc surface.

Figure 5:
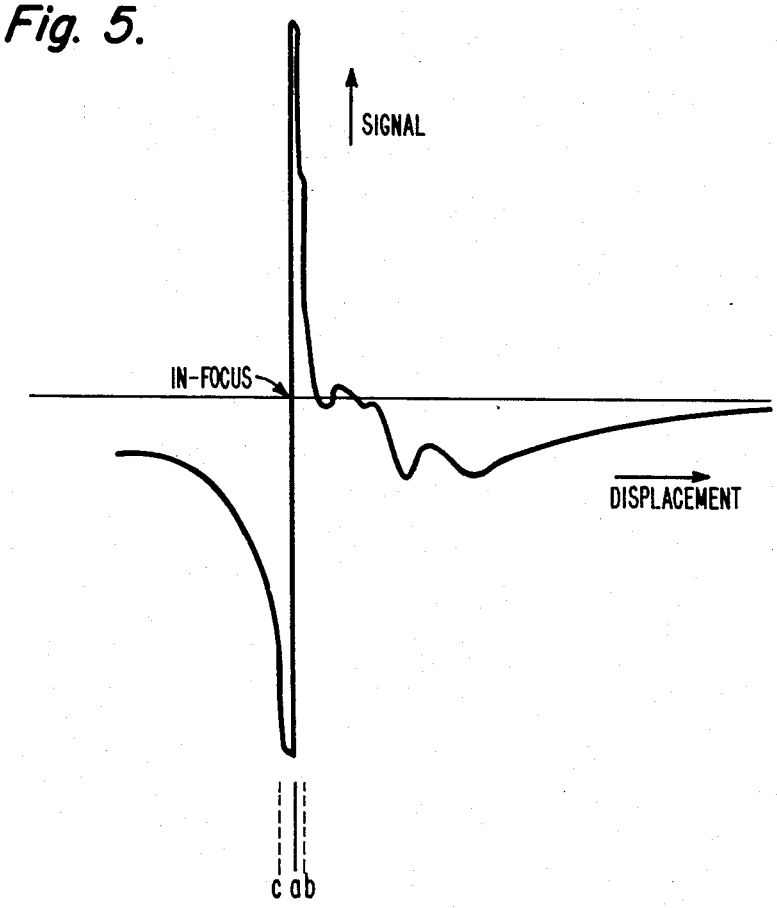
FIG. 5 is a waveform illustrating both the near and far field characteristics of the transducer and error signal circuitry.

As the disc surface moves away from lens 17' the circle illuminated on the surface becomes progressively smaller until the surface reaches the point 75 where the spot is diffraction limited and then the circle becomes larger as shown at position d. The error signal as a function of displacement is shown in FIG. 5. This signal has a signature such that position of the disc surface may be determined unambiguously from a distance of a few micrometers (e.g., 20 μm) outside of focus until the lens 17 contacts the surface.

In order to ensure that the focus error signal is unaffected by the groove tracking error, disc reflectivity variations or groove modulation the diameter of landing spot 39 on the disc surface is adjusted such that it is large enough to span a plurality of grooves. For example, for the case where the groove spacing is 2.5 μm, the landing spot 39 may be provided with a diameter of 100 μm, thus spanning approximately forty grooves, the detectors actually receiving light from about ten grooves. It will be appreciated that when landing spot 39 on the surface of disc 1 is relatively large, when compared to the size of the landing spot for the read beam, the reflected light beam is simultaneously influenced by a plurality of adjacent grooves so that the modulation of the reflected light by surface undulations or reflectivity variations is averaged to eliminate or substantially minimize the overall modulation of the reflected light beam as received by detectors 51 and 53.

In the illustrative embodiment of FIG. 1 the output from detectors 51 and 53 are coupled to error signal circuit 55 for processing in accordance with the aforementioned description. The error signal which may be represented by the curve of FIG. 3 is fed into a lens moving actuator 57 for repositioning lens 17 to maintain the light beam emitted by the source of radiation 5 focused on record carrier 1. The actuator drive and actuator for the lens as represented by block 57 may be of a type described in U.S. Pat. No. 4,183,060, issued to W. E. Barnette.

In a practical embodiment of the apparatus as shown in FIG. 1, the objective lens 17 may be a 100 power collector lens. The circle of confusion 39 on the disc surface may be adjusted to be approximately 0.1 millimeter by adjusting the source to objective distance. Lens 45 may be a 25 centimeter focal length lens adjusted so that the image diameter on surface 47 of support 49 is approximately one centimeter.

One advantage of the system described herein is its relative insensitivity to mechanical shifts of the light source or image forming elements, in the angle of the disc surface, or variations of the intensity of the light source or reflectivity of the surface. Effects of positional changes of the circle of light with respect to the detector surface are generally balanced. If the light spot shifts in a radial direction with respect to the disc surface the shifts are tangential to the spot and, therefore, do not affect the error signal significantly. If the light spot shifts tangentially with respect to the disc surface the gain of output from one detector 53 is compensated for by the loss of output from the other detector 53.

The present invention provides a novel focus arrangement for maintaining constant the distance between an objective lens and a disc surface. It will be appreciated by those of skill in the art that a stop 34 may be positioned in the center of the focus control light beam, for example, at the center of lens 35 of FIG. 1, to reduce the effect of the background noise from radiation source 31 on the output of detector 21. Thus, the same light wavelength may be used for sources 5 and 31.

While the principles of the present invention have been demonstrated with particular regard to the illustrated structure of the FIGURES, it will be recognized that various departures from such illustrative structure may be undertaken in practice of the invention. For example, the focus apparatus may be used in conjunction with a recording system as well as a playback system as described herein. Further, the invention may also be applied to record carriers other than disc-shaped, for example, tape-shaped record carriers, in which the structure which represents the information lies in an substantially flat surface structure. Also the invention may be applied to non-recording/playback systems, e.g., automatic focus for microscopes, slide projectors, etc.

In another arrangement as shown in U.S. patent application Ser. No. 218,073, filed Dec. 19, 1980 of M. J. Lurie concurrently filed herewith, the imaging lens 45 of FIG. 1 may be replaced with a quasi-zoom lens arrangement which permits easier optical alignment during set up.

What is claimed is:

1. A focus control apparatus for use with a disc-shaped record medium having information stored in a spiral groove formed on a flat, reflective surface thereof, the apparatus comprising:
   a first light source emitting a beam of light of a first given wavelength;
   a first light path optically coupling said first light source and said reflective surface of said record medium, said first light path including means for focusing said light beam emitted by said first light source to a diffraction limited spot on said surface of said record medium;
   first light detection means having a photosensitive surface, said light detection means being used to detect said information stored in said spiral groove;
   a second light path optically coupling said focused light spot on said surface of said record medium to said photosensitive surface of said first light detection means;

a second light source emitting a beam of light of a second given wavelength;

a third light path optically coupling said second light source and said reflective surface of said record medium, said third light path including said means for focusing, said light beam emitted by said second light source being projected by said means for focusing to impinge on said reflective surface as a circular region having a diameter sufficiently large to span a plurality of groove convolutions of said spiral groove;

second light detection means having four photosensitive regions arranged to measure the diameter of an illuminated spot incident on said second light detection means;

a fourth light path coupling said circular region on said reflective surface to said second light detection means and including means for imaging a conjugate image of said circular region onto said second light detection means; and means, responsive to said second light detection means, for generating a signal representative of the diameter of said conjugate image; and means, responsive to said signal generated by said generating means, for varying the distance between said focusing lens and said reflective surface of said record medium to maintain said light beam emitted by said first source in-focus on said reflective surface.

2. The apparatus according to claim 1 wherein said first given wavelength is 633 nm and wherein said second given wavelength is 820 nm.

3. The apparatus according to claim 1 wherein said four photosensitive regions include:

a first pair of photosensitive regions positioned on said second light detection means to be illuminated by said illuminated spot when an in-focus condition exists; and third and fourth photosensitive regions, said third photosensitive region being positioned adjacent a first one of said pair of photosensitive regions and partially illuminated by said circular area when said in-focus condition exists and said fourth photosensitive region being positioned adjacent a second one of said pair of photosensitive regions and partially illuminated by said circular area when said in-focus condition exists.

4. The apparatus according to claim 3 further comprising a stop located in said third light path.

* * * * *